United States Patent
Rodrigues (10) Patent No.: US 8,341,884 B2
(45) Date of Patent: Jan. 1, 2013

(54) MODULAR CONTAINER SYSTEM

(75) Inventor: Manuel Maria Rodrigues, Carnaxide (PT)

(73) Assignee: Quizcamp-Fabrico e Comércio de Produtos Alimentares, S.A., Lisboa (PT)

( * ) Notice: Subject to any disclaimer, the term of this patent is extended or adjusted under 35 U.S.C. 154(b) by 575 days.

(21) Appl. No.: 12/161,761

(22) PCT Filed: Jan. 23, 2006

(86) PCT No.: PCT/PT2006/000003
§ 371 (c)(1),
(2), (4) Date: Apr. 6, 2010

(87) PCT Pub. No.: WO2007/084020
PCT Pub. Date: Jul. 26, 2007

(65) Prior Publication Data
US 2010/0186295 A1    Jul. 29, 2010

(51) Int. Cl.
*A01G 9/02* (2006.01)
*A01G 25/00* (2006.01)
(52) U.S. Cl. ............................................. 47/86; 47/82
(58) Field of Classification Search ........... 47/66.1, 47/66.6, 82, 83, 85, 86
See application file for complete search history.

(56) References Cited

U.S. PATENT DOCUMENTS

| 523,991 | A | * | 8/1894 | Oliver | 47/85 |
| 3,389,499 | A | * | 6/1968 | Haile | 47/33 |
| 4,614,056 | A | * | 9/1986 | Farkas | 47/67 |
| 4,964,761 | A | * | 10/1990 | Rossi | 405/286 |
| 5,511,342 | A | | 4/1996 | Maso | |
| 2008/0092442 | A1 | * | 4/2008 | Singer | 47/66.1 |
| 2010/0313474 | A1 | * | 12/2010 | Williams | 47/65.7 |

FOREIGN PATENT DOCUMENTS

| DE | 29720843 U1 | 5/1999 |
| DE | 20014244 U1 | 3/2001 |
| GB | 2400119 A | 10/2004 |
| WO | 00/04758 A1 | 2/2000 |

* cited by examiner

*Primary Examiner* — Monica Williams
(74) *Attorney, Agent, or Firm* — Marsh Fischmann & Breyfogle LLP (57) ABSTRACT

The present invention relates to a modular container system for use in agriculture, gardening and construction, characterized in that it comprises a parallelepiped container 1 with two partition walls 2 forming three chambers 3, its top ends each having a sleeve 4 which forms a vertical channel 5, the lower end 6 of the said sleeve extending beyond the bottom of the container but with slightly smaller dimensions and having a groove 10 around its whole periphery; connectors 9 which join adjacent containers in a horizontal plane; a base 11 which allows the containers to rest on the ground; and a lateral support 13 exactly identical to the top end of the container 1.

11 Claims, 15 Drawing Sheets

MODULAR CONTAINER SYSTEM

The present invention relates to a modular container system, more specifically a system of plant pots which can be joined together by connectors and by stacking, allowing the creation of modular structures with various formats. The system can be used in agriculture, floriculture, construction of partitions, walls and pathways in open spaces, being especially suitable for use inside rooms, shopping centres and offices. In agriculture it can be used as a plant pot for growing outdoors or inside a greenhouse. It is particularly useful for growing crops using the technique of hydropony where the pots are filled with substrate instead of soil. In gardening it can be used as a pot for growing ornamental plants and in the construction industry it can be used as a decorative feature for outdoor or indoor areas, with or without plants, for forming walls, partitions or simple flower pots.

PRIOR ART

The applicant is not aware of any container systems with the characteristics mentioned in claim 1.

Of the known containers or pots, the applicant would like to mention those forming the subject matter of U.S. Pat. No. 5,511,342, DE 29720843U and DE 20014244U.

U.S. Pat. No. 5,511,342 relates to flower pots forming a self-supporting modular structure comprising a plurality of flower pots each comprising first container elements united together through at least one channel and suited to contain ornamental plants, co-axially matchable through the fixed joint formed by their matching profiles. Each of the mentioned flower pots can be co-axially matched with a second container element through the fixed joint formed by their matching profiles. Moreover, each of the said container elements fits co-axially inside an underpot tray.

Patent DE 29720843U relates to a modular construction for flower pots, boxes, trays, etc. in which each of the construction modules is diamond shaped, comprising two triangular elements and being truncated at each of the four corners. Two projections formed by three parts are segmented into two triangular sections and one rectangular section. These projections are situated at the centre of the two front edges of the diamond-shaped portion on the longitudinal axis of the profile when viewed from the side.

Patent DE 20014244U relates to a modular receptacle in the shape of a column for house or garden plants, which comprises a series of tubular sections and separating panels with holes, and an underpot for collecting drained-off water. The various sections of the column, with a circular cross-section, can be joined together by means of a screwing connection system, possibly using screwed separation panels. The side openings for the plants can be positioned in various directions by rotating the sections. The column can be used as a simple receptacle for plants or as an architectural element suited to support loads, or for forming a partition between compartments. The receptacle of the invention consists of modular parts that are easy to assemble on top of each other, in order to constitute a receptacle for plants or a flower pot.

As may be observed, none of the documents are similar to the subject matter of this invention.

SUMMARY OF THE INVENTION

The present invention relates to a modular container with a parallelepiped configuration having two partitions that form three compartments, which are joined together, its top ends each having a sleeve forming a channel, the lower end of which ends in a projecting tubular tip. The lateral walls along the longer sides of the container can have projecting bellies.

BRIEF DESCRIPTION OF THE FIGURES

The description that follows is based on the drawings attached hereto, which represent without any restrictive character.

DETAILED DESCRIPTION OF THE INVENTION

As can be seen from the figures, the modular pot of the invention consists essentially of a parallelepiped container 1 with two partition walls 2 which form three chambers 3. The top ends of the container each have a sleeve 4 which forms a vertical channel 5, the lower end 6 of the said sleeve extending beyond the bottom of the container but having slightly smaller dimensions. The dimensions of this lower end 6 enable the container to be fitted onto the upper end of the said channels 5, which makes it possible to stack the containers 1 on top of each other.

Figure 26:
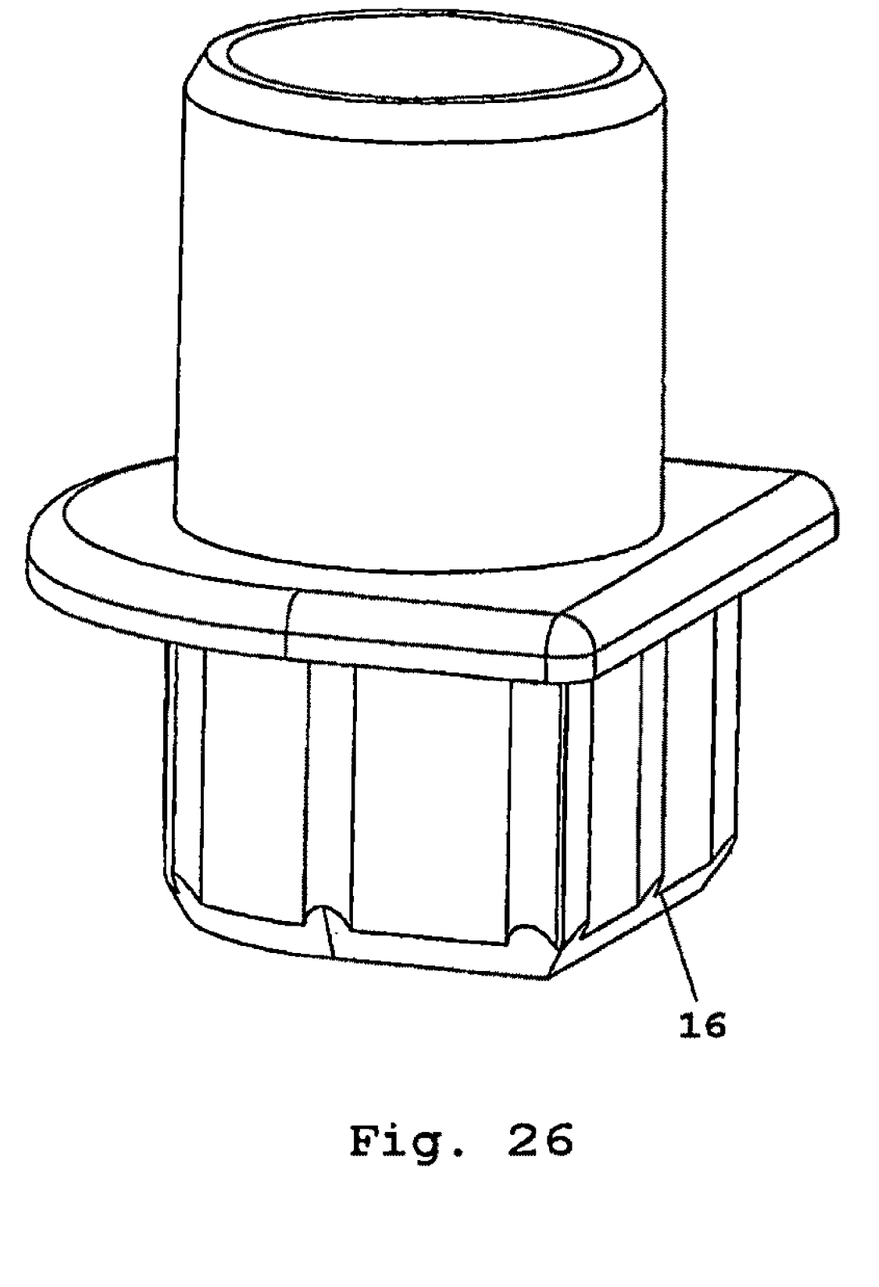
in FIG. 26, a perspective view of the supporting element.
Figure 29:
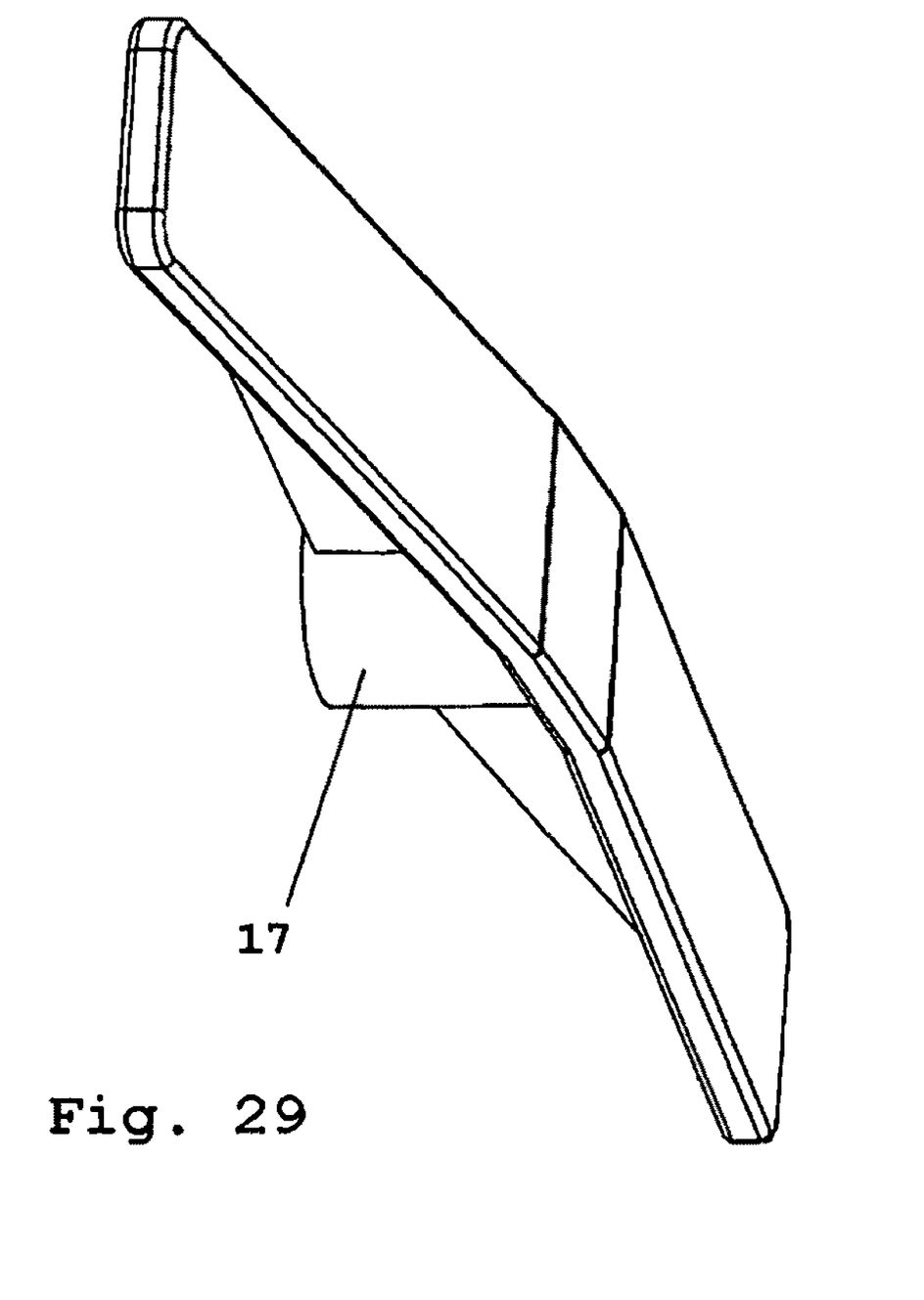
in FIG. 29, a perspective view of a suspension element.

This tubular structure formed by the channels 5 joins the containers together when they are stacked vertically, and the vertical channel created by the succession of containers can be used as a drainage channel for infiltrated or irrigation water and as a guide for the insertion of a vertical tube in order to increase the stability of the whole structure. A supporting element 16 (FIG. 26) can be inserted into this channel 5 and the said supporting element can receive a tube suited to support a profile 17 (FIG. 29) for suspending and supporting a shading net or film, a protective plastic covering for creating a greenhouse and/or for installing an air irrigation system.

The containers represented in FIGS. 5 to 15 have the same characteristics and are simply provided with conical projections in, the longer lateral walls. These projections form "bellies" which extend outwards and can be formed on one side of the container 1 or on both sides.

In FIGS. 5 to 8 the container 1 has conical projections 7, one on each chamber 3, but only on one side of the container 1. In FIGS. 9 to 12 the container 1 has the same conical projections 7 but on both sides.

FIGS. 13 to 16 and 17 to 19 represent other embodiments of the invention. As may be observed, in FIGS. 13 to 16 the container 1 has only one projection 8 with a configuration substantially similar to that of the conical projections 7, which extends across all the chambers 3. In FIGS. 17 to 20, the container 1 has a projection 8 on both sides, which extends across the three chambers 3. In the latter two embodiments, the partition wall 2 which forms the chambers 3 extends right up to the wall of the projection 8.

Figure 1:
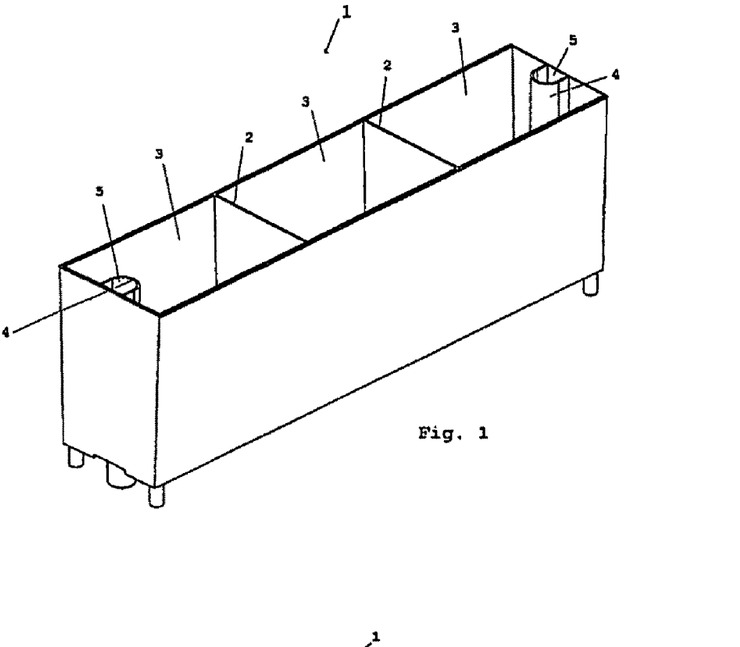
in FIGS. 1 to 4, an embodiment of the container of the invention being, respectively, a perspective view, a main elevation, a side elevation, and a plan view.
Figure 2:
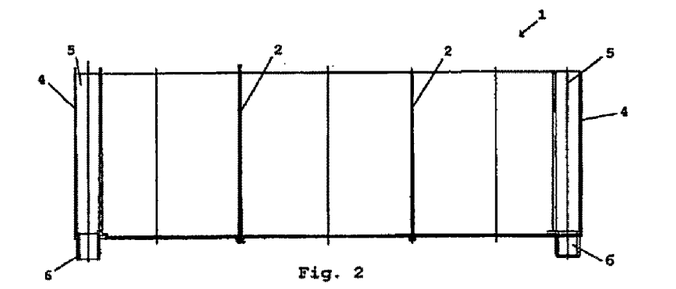
Figure 3:
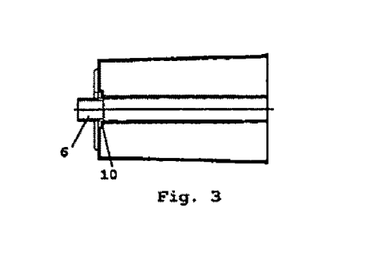
Figure 4:
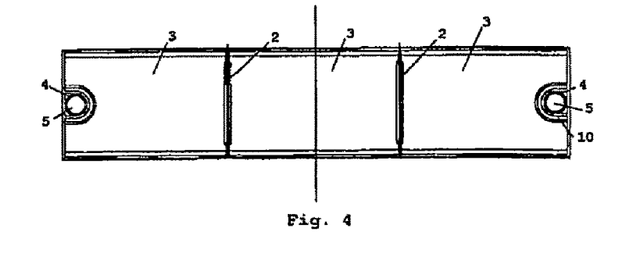
Figures 5, 6:
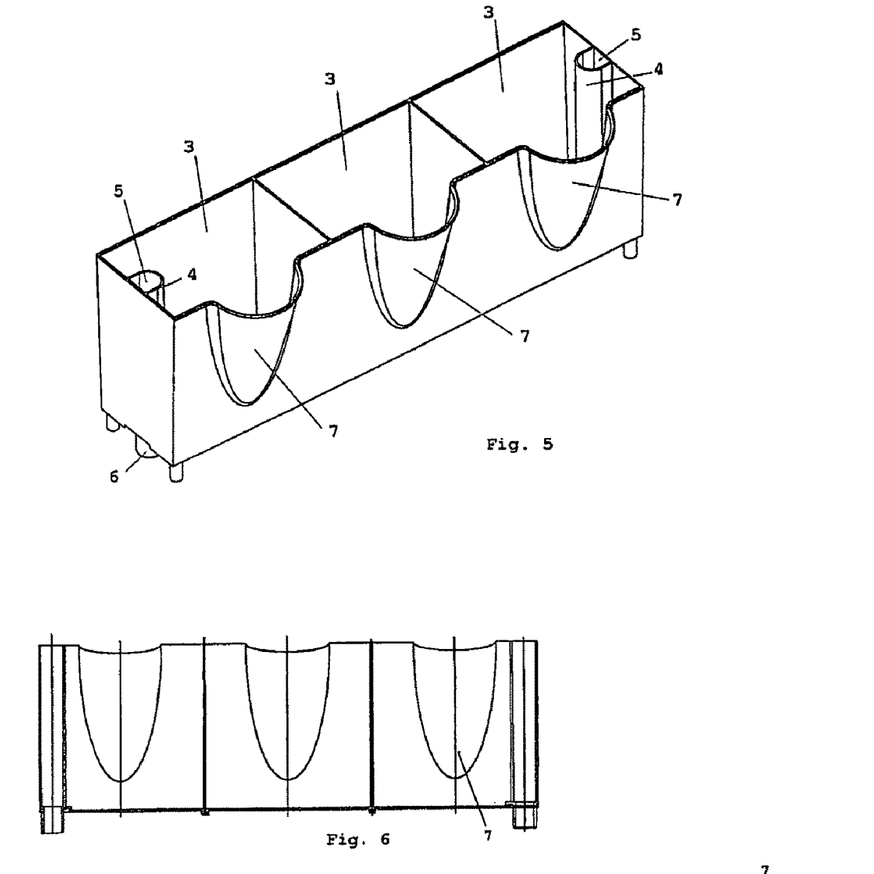
in FIGS. 5 to 8, another container being a second embodiment of the invention.
Figure 7:
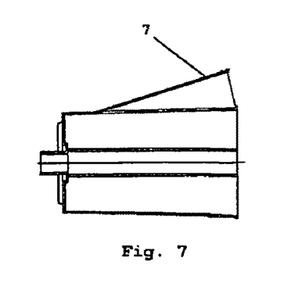
Figure 8:
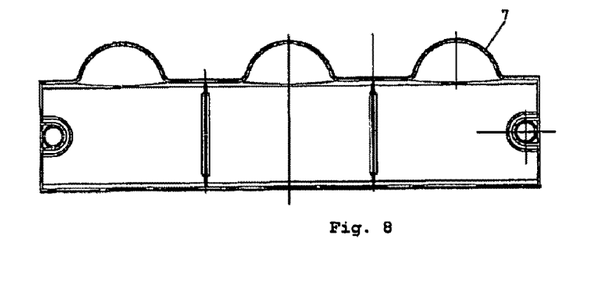
Figure 9:
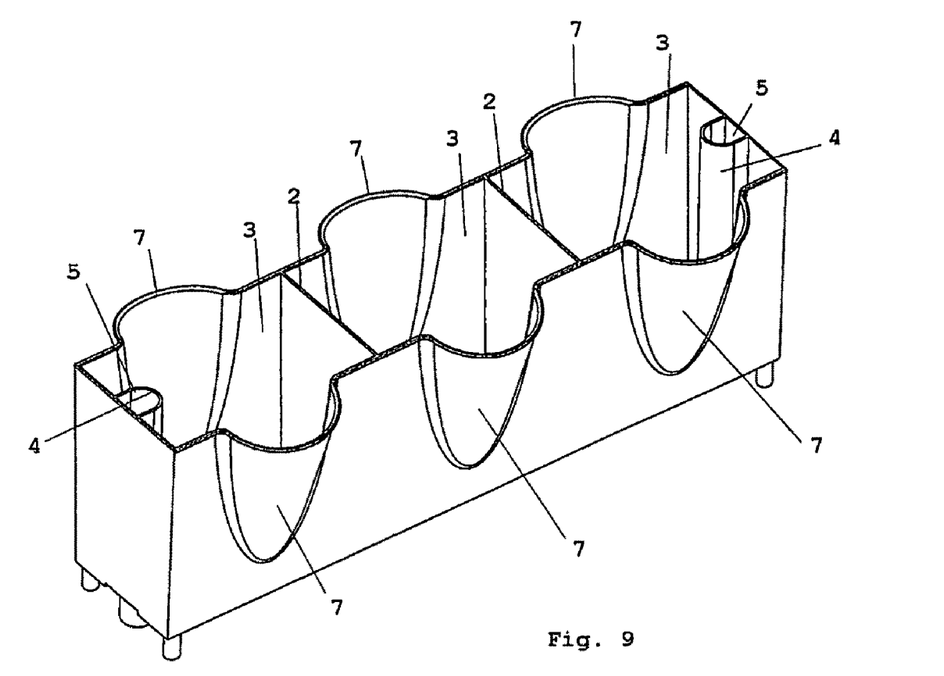
in FIGS. 9 to 12, another container being a third embodiment of the invention.
Figure 10:
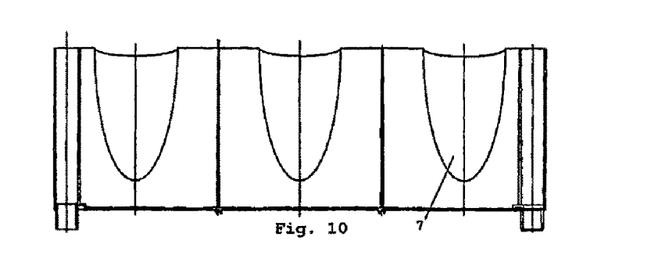
Figure 11:
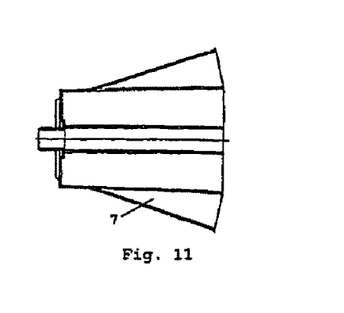
Figure 12:
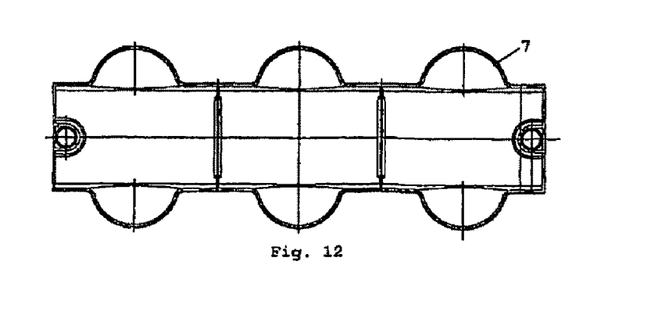
Figure 13:
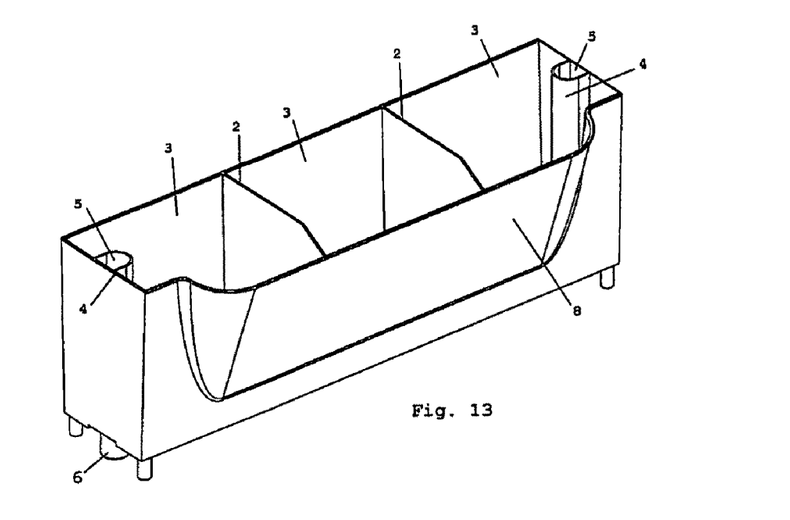
in FIGS. 13 to 16, another container being a fourth embodiment of the invention.
Figure 14:
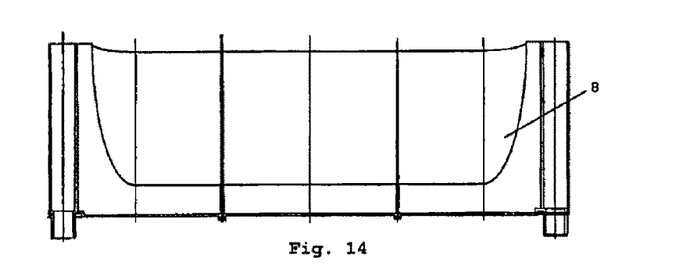
Figure 15:
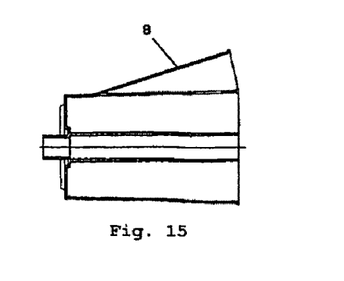
Figure 16:
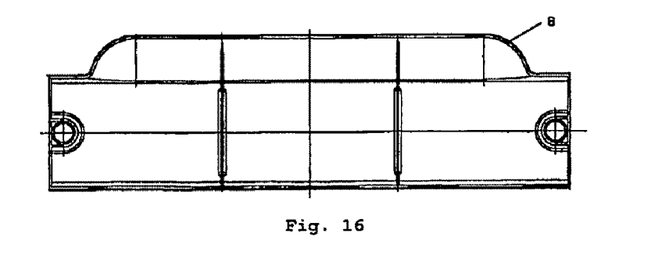
Figure 17:
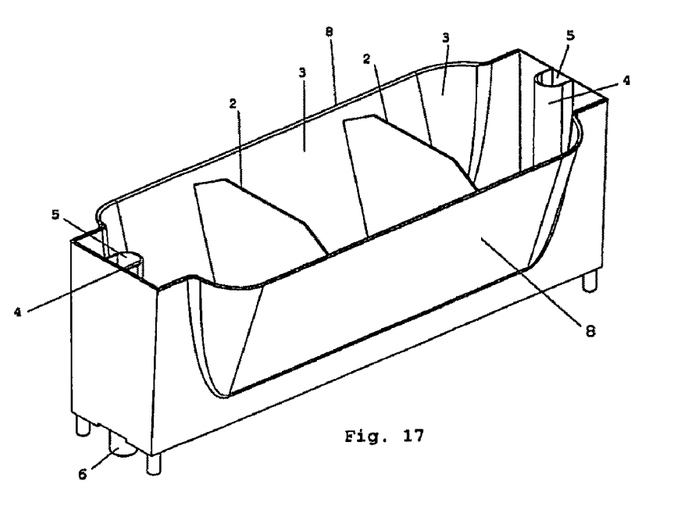
in FIGS. 17 to 20, another embodiment of the invention.
Figure 18:
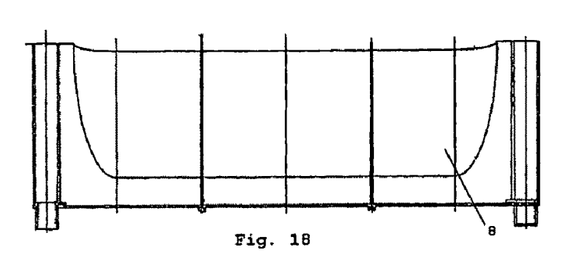
Figure 19:
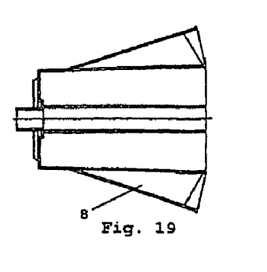
Figure 20:
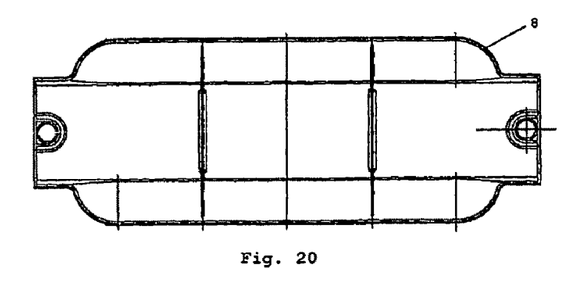
Figure 21:
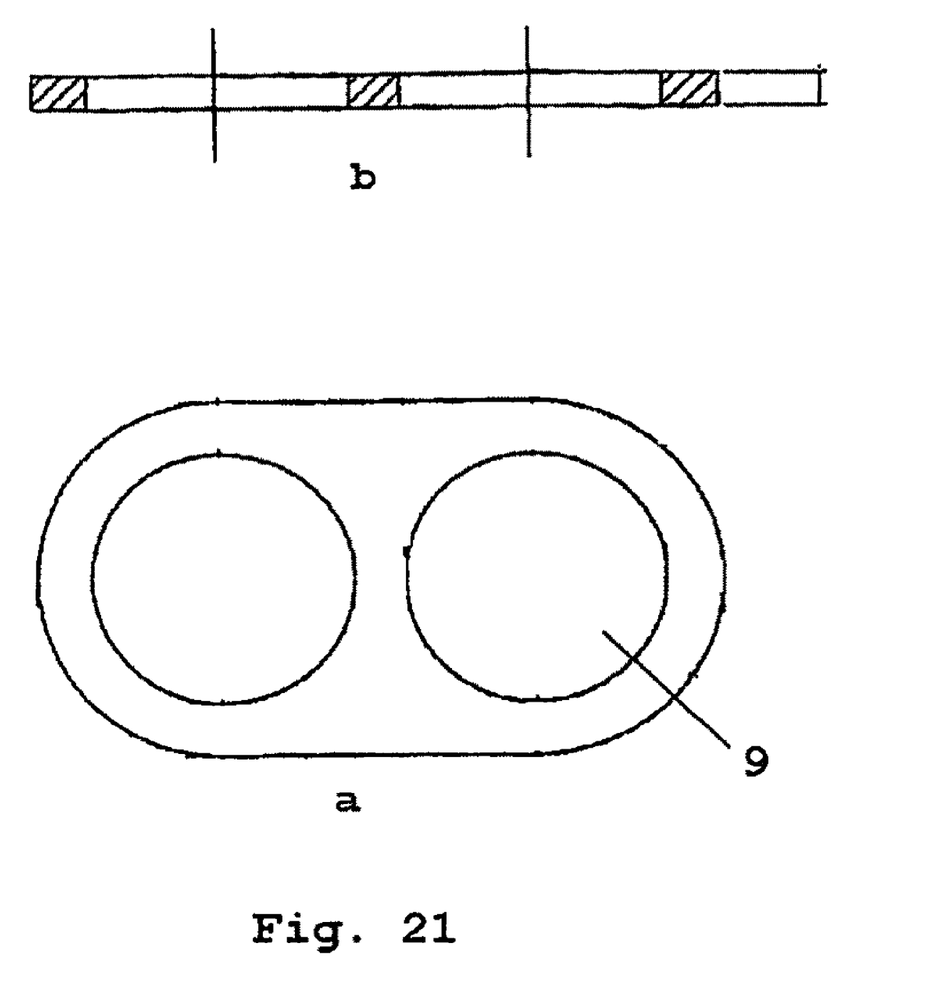
in FIGS. 21, 22 and 23, *a* and *b* respectively, an elevation and plan view of the container connectors.
Figure 22:
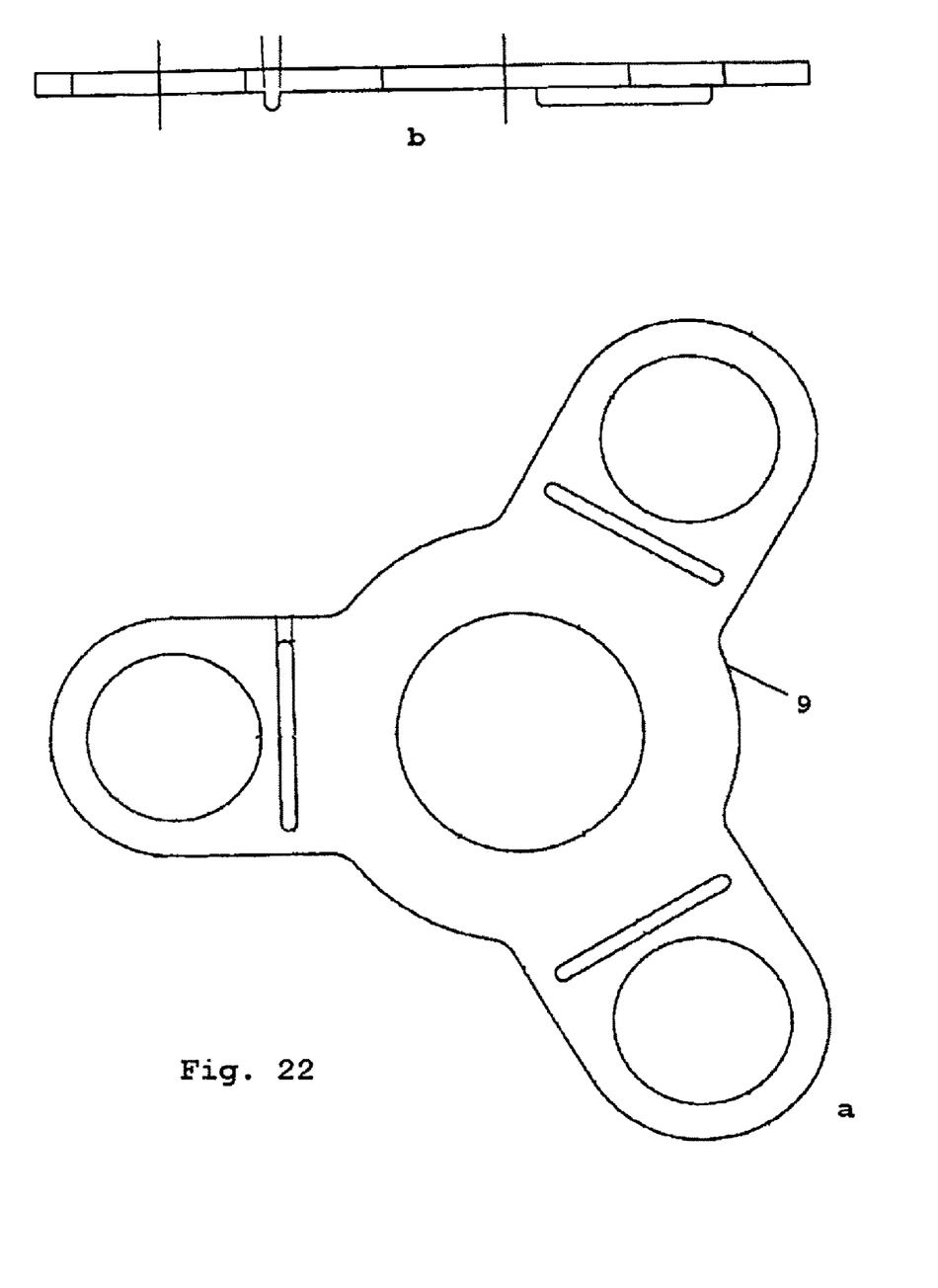
Figure 23:
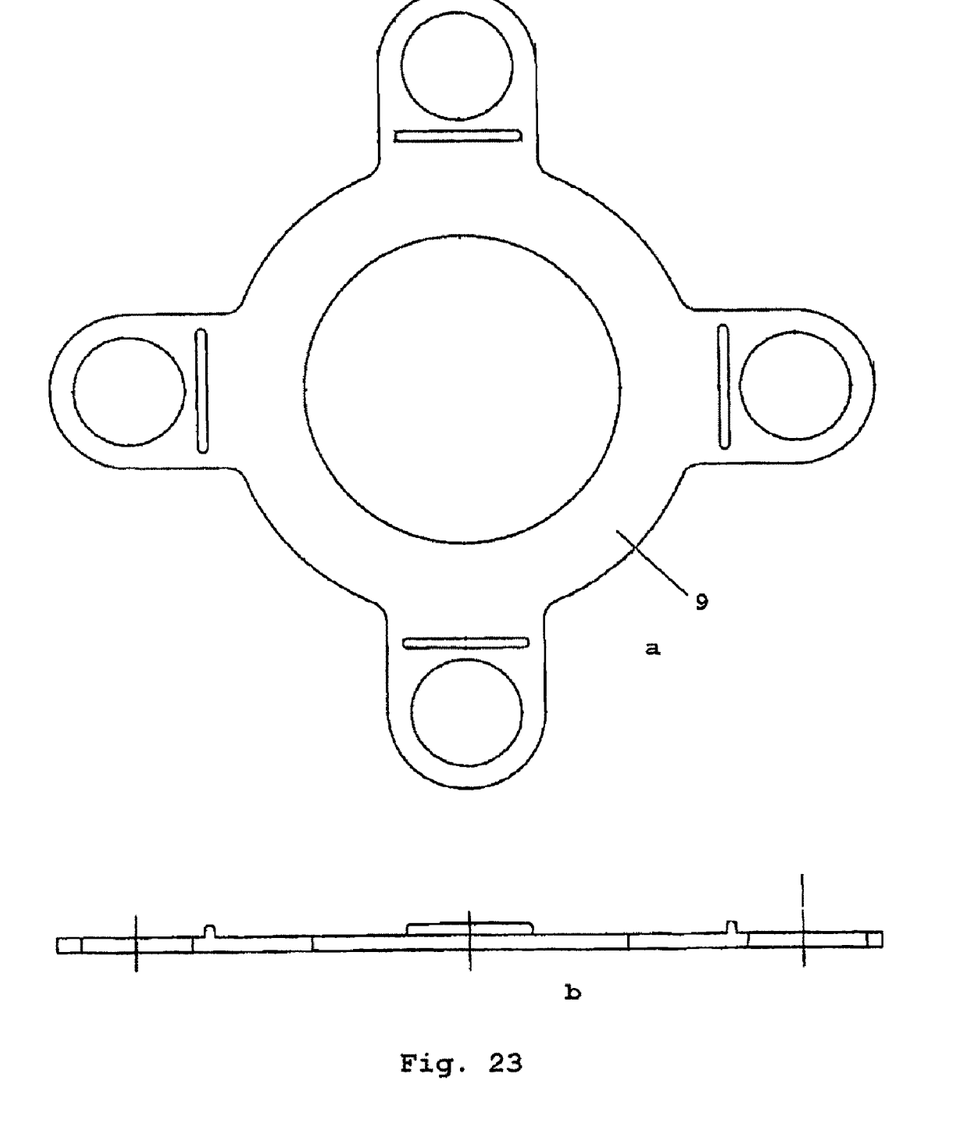

The system also includes the connectors 9 represented in FIGS. 21 to 23, which have the function of joining adjacent containers in a horizontal plane. In FIG. 21 the connector 9 is formed by a ring element with two circular holes, in FIG. 22 the connector 9 is formed by an element with three arms, each of which contains a circular hole, and in FIG. 23 the connector 9 is formed by a cross-shaped element with four arms, each of which contains a circular hole. As may be understood, these connectors make it possible, respectively, to join two containers side-by-side, three containers in the form of a triangle and four containers in four directions defined by the sides of the connector. All of the connectors 9 are placed inside the groove 10 provided for this purpose on the inside of the container 1.

Figure 24:
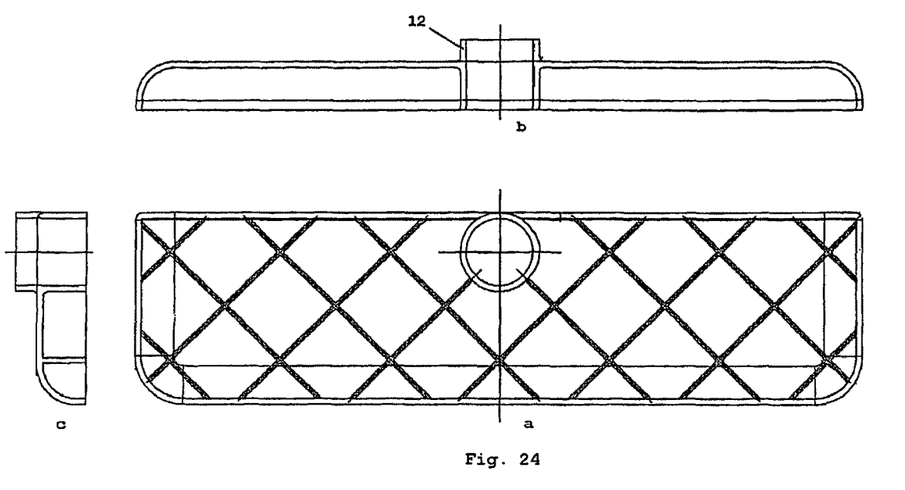
in FIGS. 24 *a*, *b* and *c*, a base for the container being, respectively, a plan view, a main elevation and a side elevation.

All of the abovementioned containers have to be placed on the base 11 (FIG. 24), which allows the containers to rest on the ground. They are positioned by fitting the lower end 6 into the tubular projection 12 provided on the base.

Figure 25:
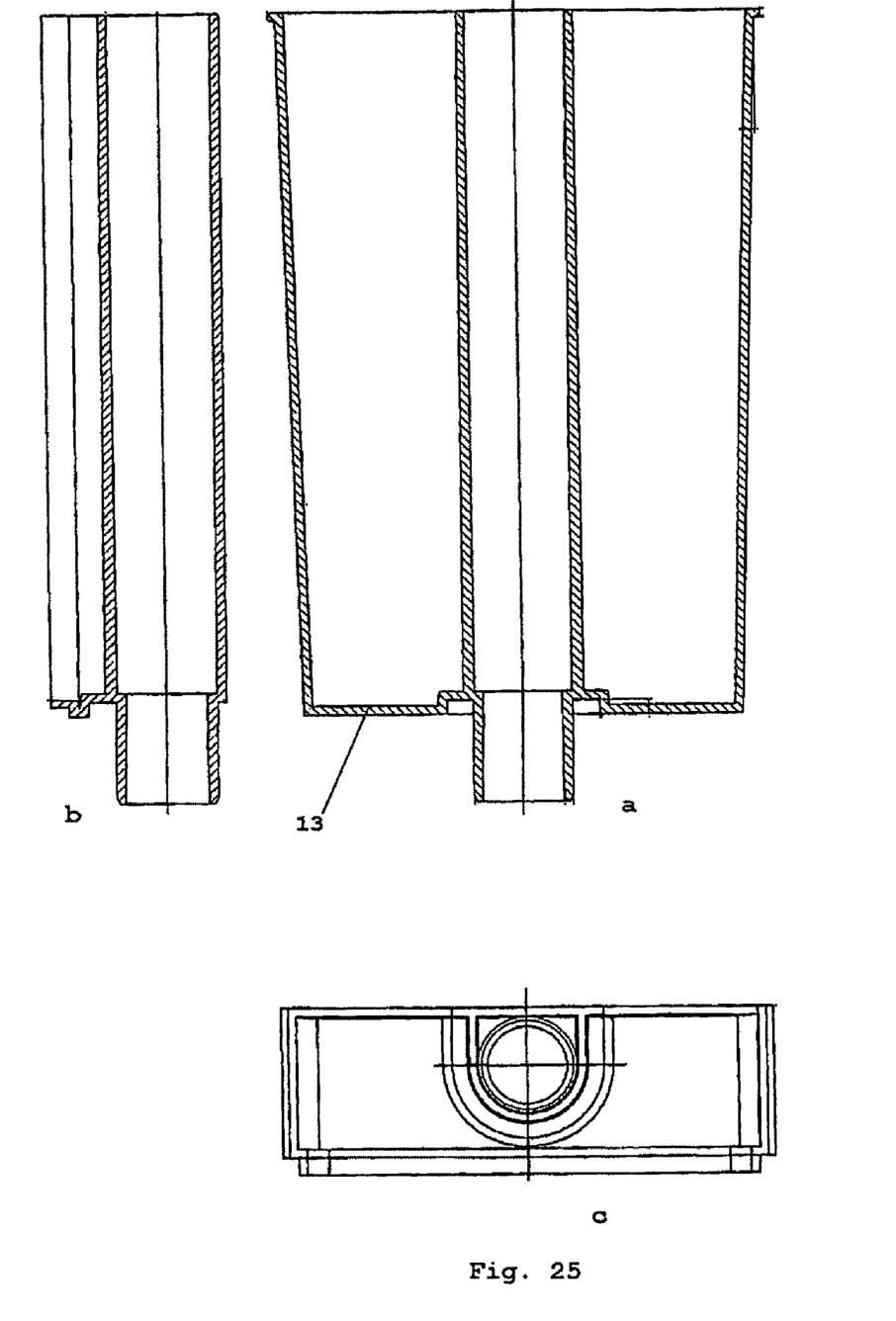
in FIGS. 25 *a*, *b* and *c*, a view of the lateral support being, respectively, a main elevation, a side elevation and a plan view.

The lateral supports 13 (represented in FIGS. 25 a, b and c), which are exactly identical to the top end of the container 1, make it possible, in more complex structures, to create spaces without containers and configure the side walls of such structures.

Figure 27:
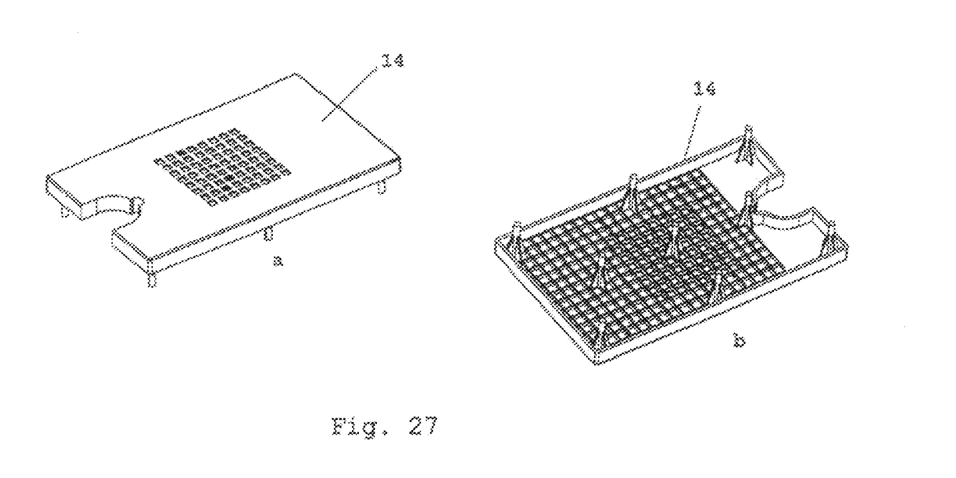
in FIG. 27, *a* and *b* respectively, a perspective view from above and from below of a grill to be placed inside the container.

Inside the chambers 3 a drainage grill 14 can be fitted (FIG. 27), which is intended to create a humidity deposit at the bottom of the pot and allow radicular aeration through the channel 5 created when the containers are assembled. This element has the configuration of a tray with feet distributed across its inside surface for supporting the bottom of the container 1, and a grill for aeration.

Figure 28:
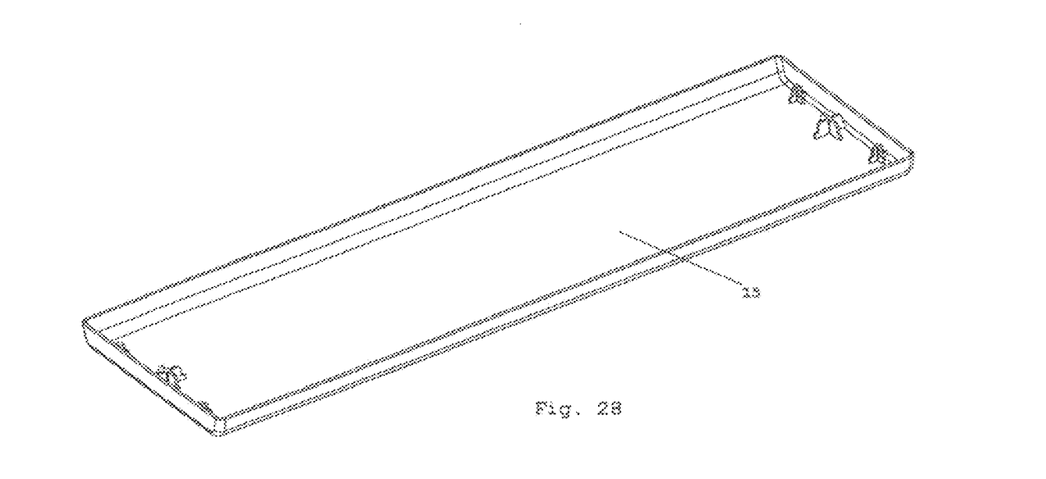
in FIG. 28, a perspective view of a tray for collecting drained water.

The drained, rain or irrigation water can be collected by a tray 15 which is placed at the bottom of the container and has an appropriate configuration, as shown in FIG. 28.

Figure 30:
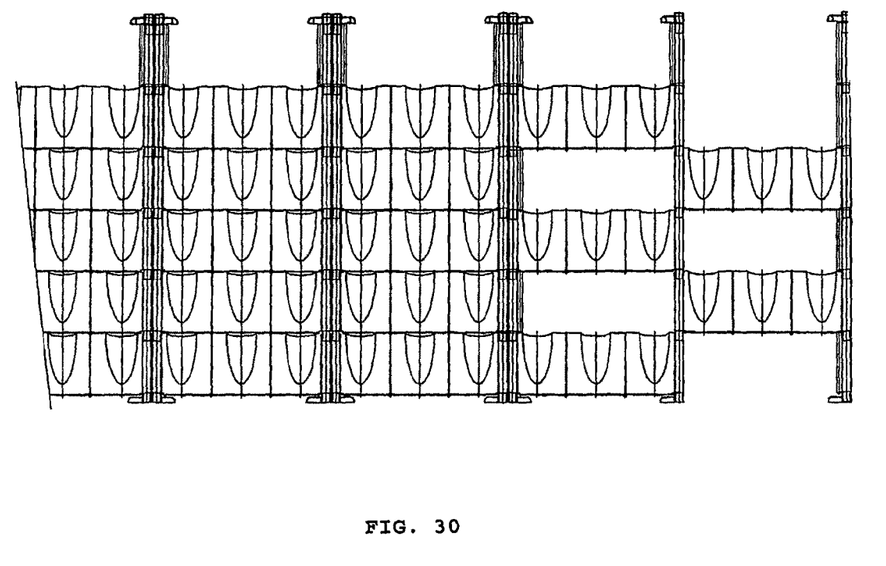
in FIG. 30, a possible set of modular pots; and in FIG. 31, another set of modular pots.
Figure 31:
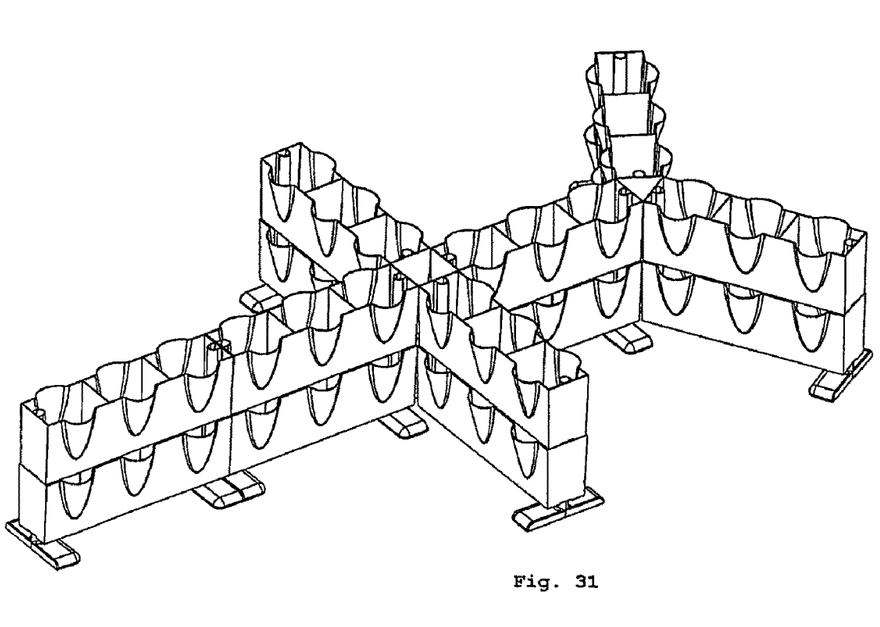

As well as the numerous construction solutions resulting from the multiple assembly combinations offered by the containers, connectors and supporting parts, this system also provides an innovative crop-growing solution, which makes it possible to grow at a height and in a vertical direction by stacking the containers on top of each other (FIGS. 30 and 31). This solution is particularly appropriate for decorative and intensive agriculture and gardening. As an example, we would point out the advantages of using this technique for growing strawberries, which include the possibility of growing the fruit without any contact with the ground, easy harvesting and, most importantly, a yield per m² of occupied area six times higher (in the case of flower pots stacked in six rows) than the traditional solution.

The invention claimed is:

1. A modular container system for use in agriculture, gardening and construction, characterised in that it comprises:
    a parallelepiped container with two partition walls forming three chambers, its top ends each having a sleeve which forms a vertical channel, the lower end of said sleeve extending beyond the bottom of the container but with slightly smaller dimensions and having a groove around its whole periphery;
    connectors which join adjacent containers in a horizontal plane,
    a base which allows the containers to rest on the ground;
    a lateral support exactly identical to the top end of the container;
    a grill intended to create a humidity deposit at the bottom of the pot and allow radicular aeration;
    a tray for collecting drained water;
    a supporting element and a profile for suspending and supporting a shading net or film, a protective plastic covering for creating a greenhouse and/or for installing an air irrigation system.

2. A modular container system, according to claim 1, characterised in that longer lateral side walls of the container can have conical projections forming "bellies" which extend outwards and can be formed on one side of the container or on both sides.

3. A modular container system, according to claim 2, characterised in that the conical projections can extend across all the chambers, forming a single projecting belly, or can be provided in each of the chambers forming three projecting bellies.

4. A modular container system, according to claim 3, characterised in that in the case of the conical projection which extends across all three chambers, the partition wall of the chambers extends right up to the wall of the projection.

5. A modular container system, according to claim 1, characterised in that the lower ends enable the container to be fitted onto the upper end of the channels, making it possible to stack the containers on top of each other.

6. A modular, container system, according to claim 1, characterised in that the connectors which join adjacent containers in a horizontal plane have the configuration of a ring element with two holes, of an element with three arms each containing a hole and of a cross with four holes, being intended, respectively, for joining the containers side-by-side, in the form of a triangle and in the form of a cross.

7. A modular container system, according to claim 6, characterised in that the connectors are placed inside the groove provided for this purpose on the inside of the container.

8. A modular container system, according to claim 1, characterised in that the tubular structure formed by the channels joins the containers together when they are stacked vertically, and the vertical channel created by the succession of containers can be used as a drainage channel for infiltrated or irrigation water and as a guide for the insertion of a vertical tube in order to increase the stability of the whole structure.

9. A modular container system, according to claim 1, characterised in that inside the chambers the drainage grill can be fitted, which is intended to create a humidity deposit at the bottom of the pot and allow radicular aeration through the channel created when the containers are assembled, said grill having the configuration of a tray with feet distributed across its inside surface for supporting the bottom of the container, and an actual grill portion for aeration.

10. A modular container system, according to claim 1, characterised in that the drained water can be collected by the tray.

11. A modular container system, according to claim 1, characterised in that the lateral support makes it possible, in more complex structures, to create spaces without containers and configure the side walls of such structures.

* * * * *